(12) United States Patent
Leoni

(10) Patent No.: US 7,075,202 B2
(45) Date of Patent: Jul. 11, 2006

(54) MIXER/STIRRER WITH MOTOR AND REDUCER HAVING INSULATING SHELL AROUND MOTOR AND CLOSED BY INSULATING CONNECTION FLANGE INTERPOSED BETWEEN THE MOTOR AND THE REDUCER

(75) Inventor: Gaetano Leoni, Poggibonsi (IT)

(73) Assignee: Imer International S.p.A., Poggibonsi (IT)

( * ) Notice: Subject to any disclaimer, the term of this patent is extended or adjusted under 35 U.S.C. 154(b) by 148 days.

(21) Appl. No.: 10/395,910

(22) Filed: Mar. 24, 2003

(65) Prior Publication Data
US 2004/0000822 A1 Jan. 1, 2004

(30) Foreign Application Priority Data
Jul. 1, 2002 (IT) .................... FI200200071 U

(51) Int. Cl.
*H02K 7/116* (2006.01)
*H02K 5/00* (2006.01)
(52) U.S. Cl. .................... 310/83; 310/75 R; 310/90; 310/91; 310/43; 366/45; 366/48; 74/606 R
(58) Field of Classification Search .............. 310/89, 310/83, 91, 58, 59, 75 R, 62, 63, 90, 43, 310/217; 366/45, 47, 48; 74/606 R
See application file for complete search history.

(56) References Cited

U.S. PATENT DOCUMENTS 2,958,794 A * 11/1960 Mann ..................... 310/75 R
3,413,498 A * 11/1968 Bowen, III et al. ........... 310/47
3,463,950 A * 8/1969 Schadlich ..................... 310/51
4,963,778 A * 10/1990 Jensen et al. .............. 310/68 D

FOREIGN PATENT DOCUMENTS

DE 2 156 483 * 2/1976
FR 2752391 * 6/1997
GB 2093410 * 9/1982

OTHER PUBLICATIONS

Translation of Strohhacker, de 2 156 483, May 24, 1973.*

* cited by examiner

*Primary Examiner*—Karl Tamai
(74) *Attorney, Agent, or Firm*—McGlew & Tuttle, P.C.

(57) ABSTRACT

A mixer/stirrer motor-reducer (e.g. as part of a mixer, stirrer or similar building machine), includes an electric motor (2) and a reducer (3) kinematically connected to the motor via a gear train (4, 6, 8) and with a relevant output shaft (9) intended for moving a mixing tank (10; 110). The motor-reducer (1) is provided with a box-shaped shell (15) made of insulating material. The shell (15) is open laterally, is able to include the casing (12) of the electric motor (2), is closable by a flange (19) and is made of electrically insulating material and is interposed between the motor (2) and the reducer (3).

16 Claims, 6 Drawing Sheets

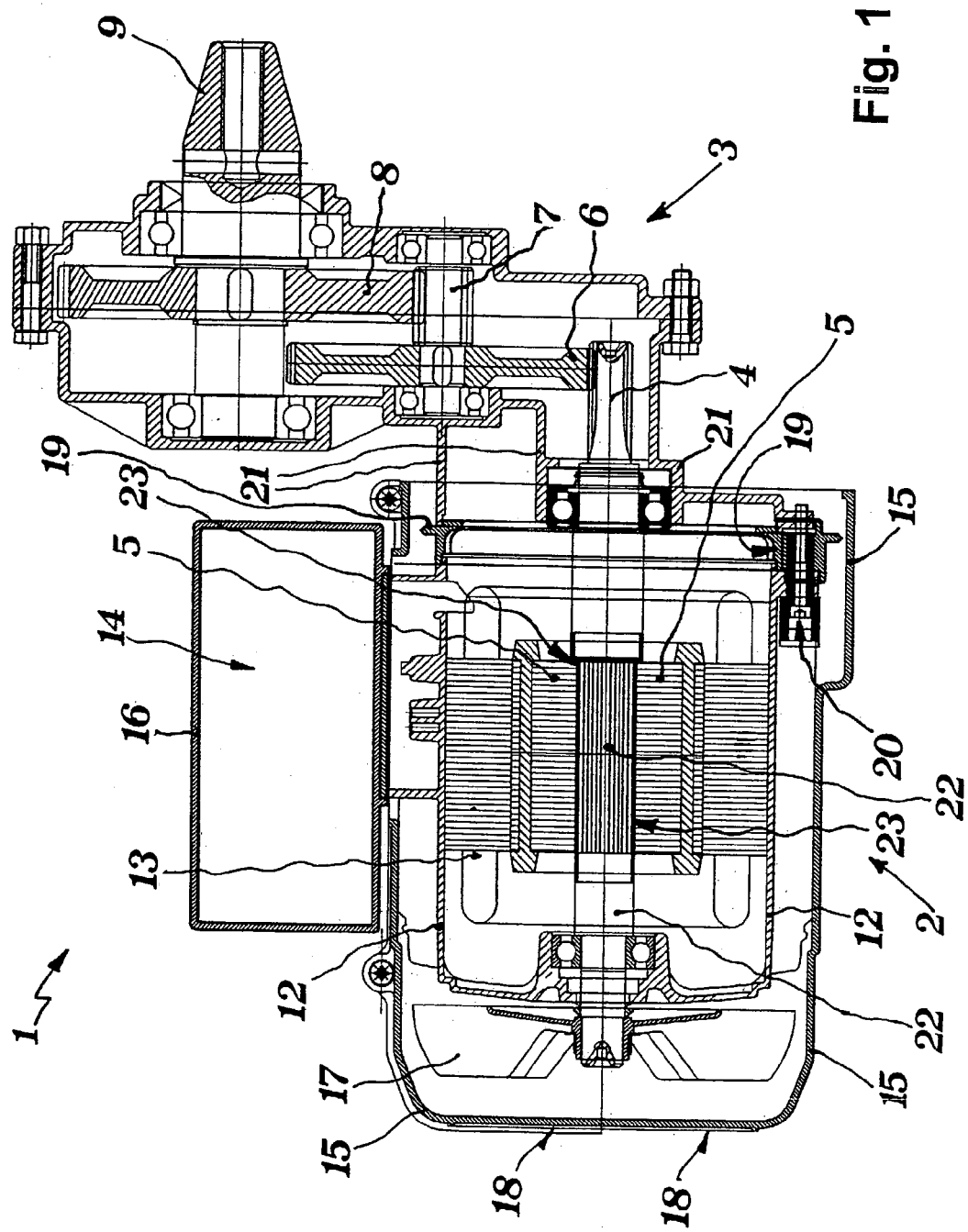

MIXER/STIRRER WITH MOTOR AND REDUCER HAVING INSULATING SHELL AROUND MOTOR AND CLOSED BY INSULATING CONNECTION FLANGE INTERPOSED BETWEEN THE MOTOR AND THE REDUCER

CROSS REFERENCE TO RELATED APPLICATIONS

This application claims the benefit of priority under 35 U.S.C. § 119 of Italian application FI2002U00071 filed Jul. 1, 2002.

FIELD OF THE INVENTION

The present invention refers to a motor-reducer to be used, in particular, for mixers, stirrers and similar machines of the building technical field and such stirrers having such a motor reducer.

BACKGROUND OF THE INVENTION

Numerous attempts have been made so far to solve the problem of the electrical insulation in building machines of the above mentioned type.

To improve the electrical insulation in motor-reducers used in building machines such as mixers and stirrers, a first approach is to insert the motor-reducer assembly within a cabin made of plastics material and containing all the above components. This solution, however, implies increased overall dimensions of the machine's part housing the motor and reducer.

A further attempt to solve the problem of the electrical insulation in a motor-reducer provides for separating the electric motor from the reducer, insulating only the motor and connecting the latter to the reducer via drive belts made of insulating material. This solution does not allow a direct connection between the motor and the reducer.

SUMMARY OF THE INVENTION

The main object of the present invention is to overcome the said drawbacks by constructing a motor-reducer provided with a dual insulation for the electrical parts.

This result has been achieved, according to the invention, by providing a motor-reducer having the characteristics indicated in the claim 1. Further characteristics being set forth in the dependent claims.

The advantages deriving from the present invention lie essentially in the fact that the motor-reducer provides a dual insulation of the electrical parts; that an improved work safety conditions are obtained; that the motor-reducer in question has an output shaft on which a mixing tank for mixers and stirrers can be directly attached; that although the invention is relatively easy to carry out, it allows the construction of an extremely safe and resistant product able to maintain its characteristics unaltered over the whole service life of the machine.

These and other advantages and characteristics of the invention will be best understood by anyone skilled in the art from a reading of the following description in conjunction with the attached drawings given as a practical exemplification of the invention, but not to be considered in a limitative sense The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view in longitudinal section of a possible embodiment of a motor-reducer according to the present invention;

DESCRIPTION OF THE PREFERRED EMBODIMENTS

Figure 2A:
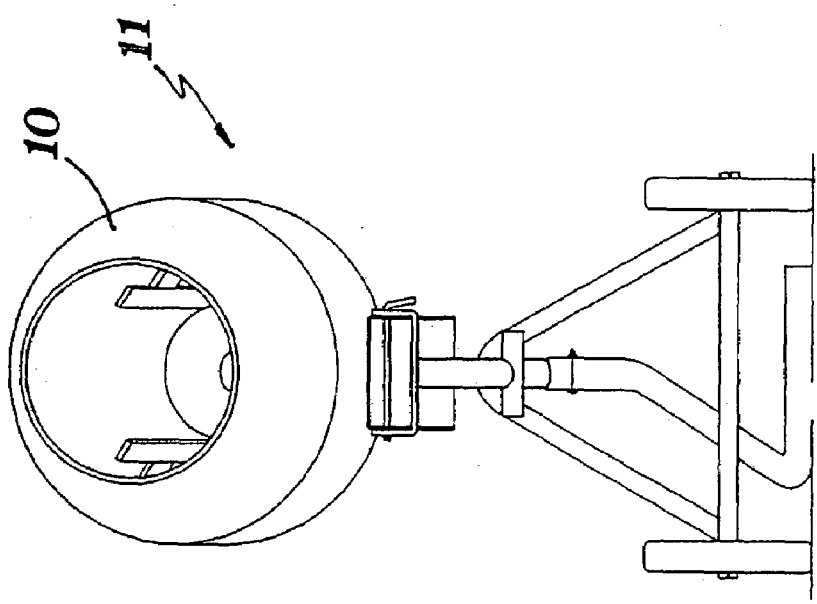
FIGS. 2A and 2B show, respectively, a side view and a front view of a first possible example of application of the motor-reducer in question.
Figure 2B:
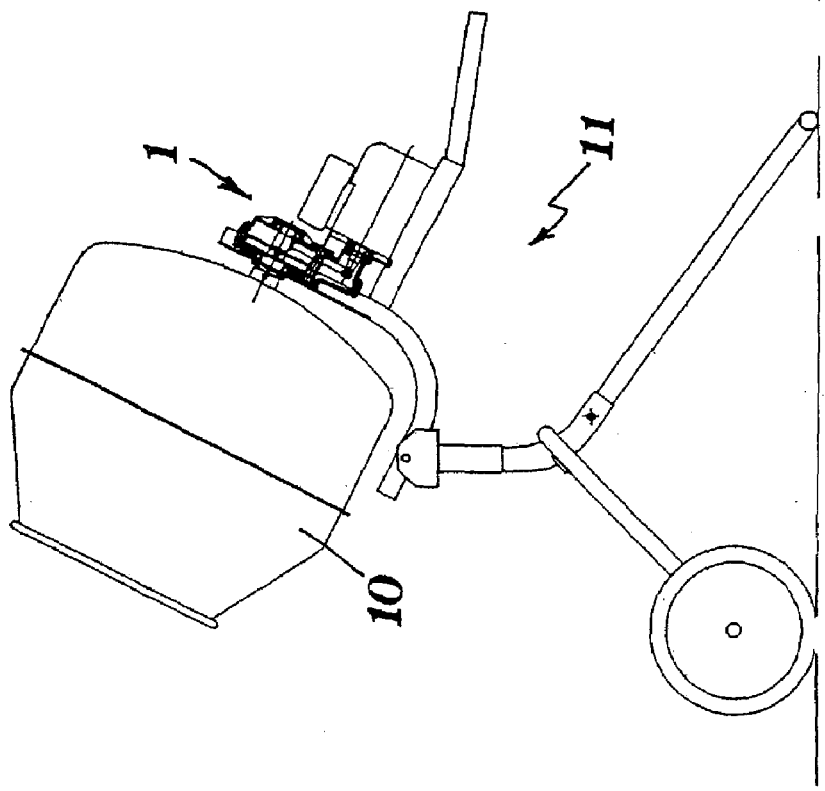
Figure 3A:
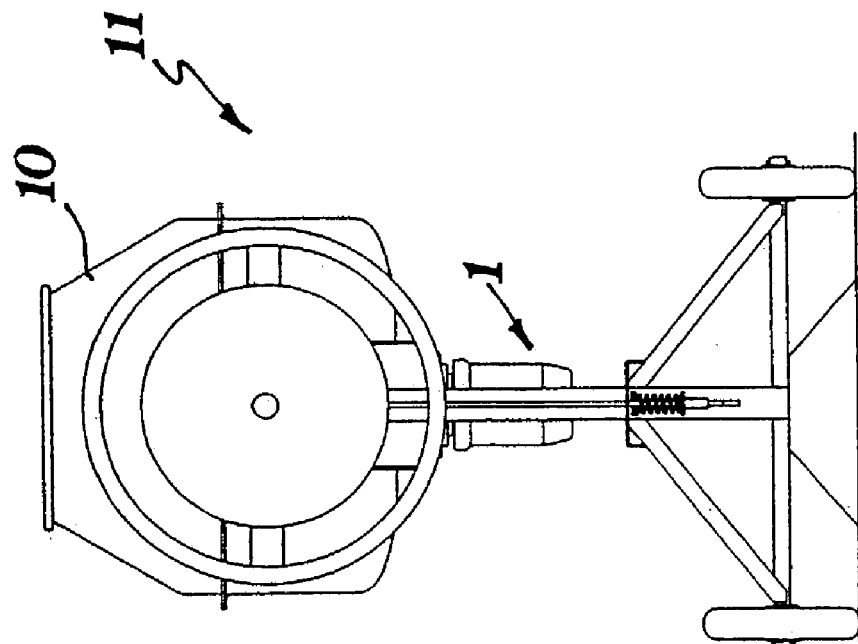
FIGS. 3A and 3B show, respectively, a side view and a front view of a second possible example of application of the motor-reducer in question.
Figure 3B:
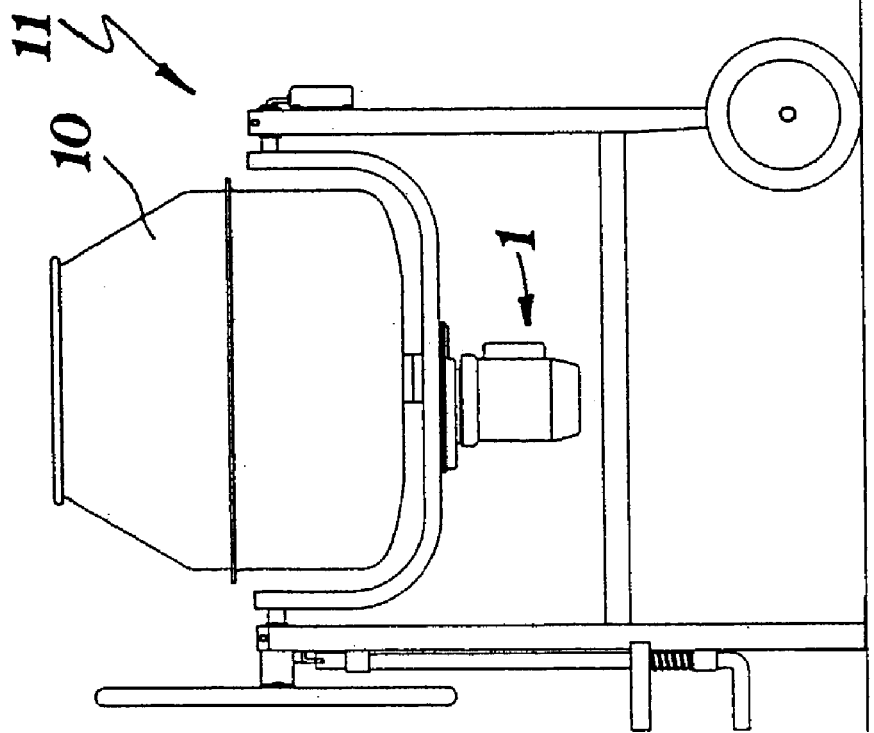
Figures 4A, 4B:
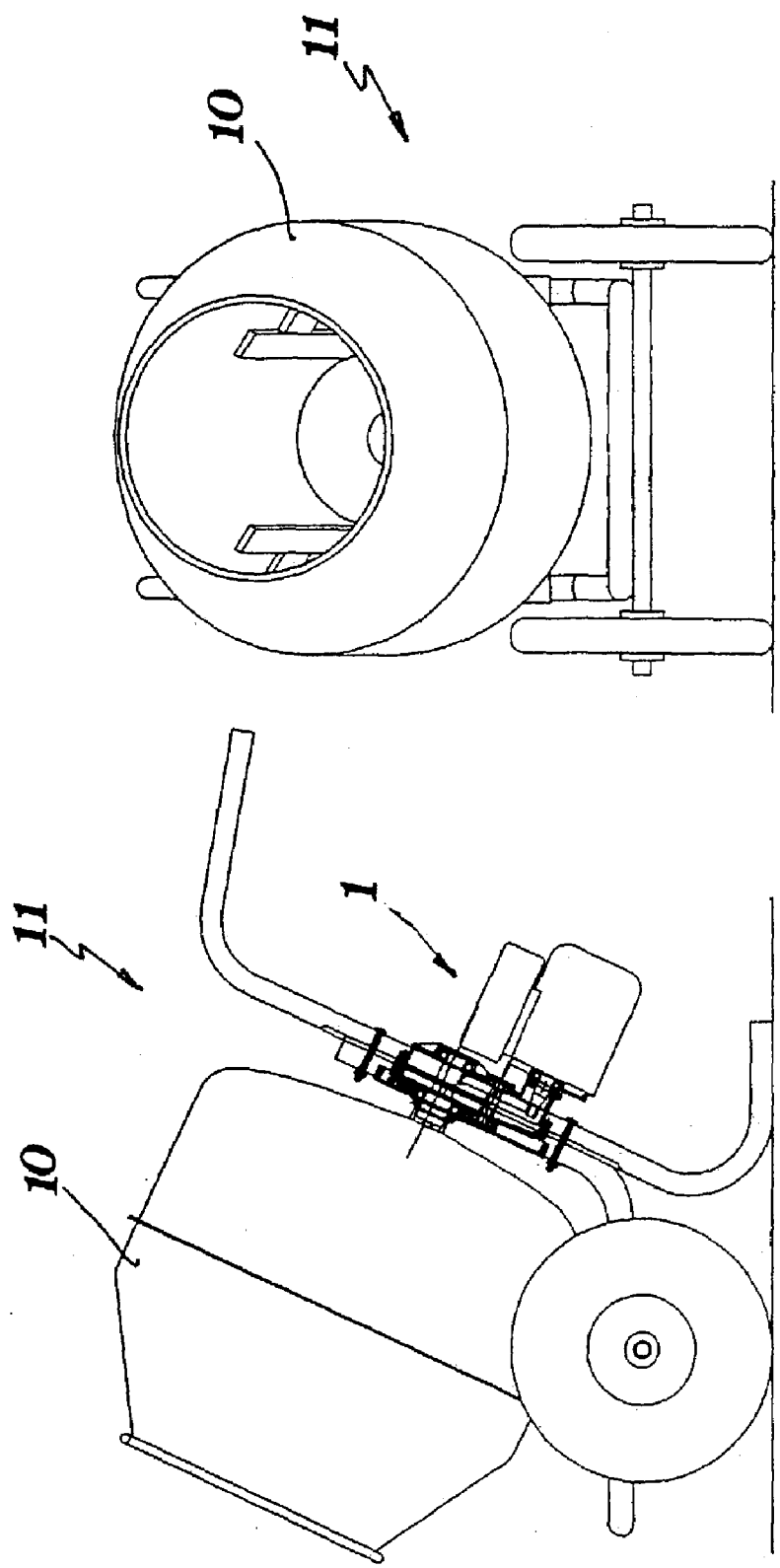
FIGS. 4A and 4B show, respectively, a side view and a front view of a third possible example of application of the motor-reducer in question.

Referring to the drawings in particular, the description which follows is made with reference to the schematic drawings of the attached figures wherein numeral (1) designates a motor-reducer as a whole, that is, comprising an electric motor (2) and a reducer (3). The electric motor (2) may be of known type having two to four poles and, accordingly, it is not described in detail.

The output of the motor (2) exhibits the toothed end (4) of a shaft (22) on which the relevant rotor (5) is keyed. The rotor's shaft (22, 4) is in meshing engagement with the first gear of a train of gears having parallel axes and making part of the reducer (3). The first gear (6) is engaged, via a pinion (7) being coaxial and solid with the same gear (6), with a second gear (8) provided with the output shaft (9) of the reducer (3). Possibly mounted directly on the output shaft (9), which can be conical as in the example of FIG. 1, is a mixer's tank (10). The output shaft (9) may be cylindrical as well, so as to allow the mounting thereof in a stirrer or other similar building machine.

Figure 5:
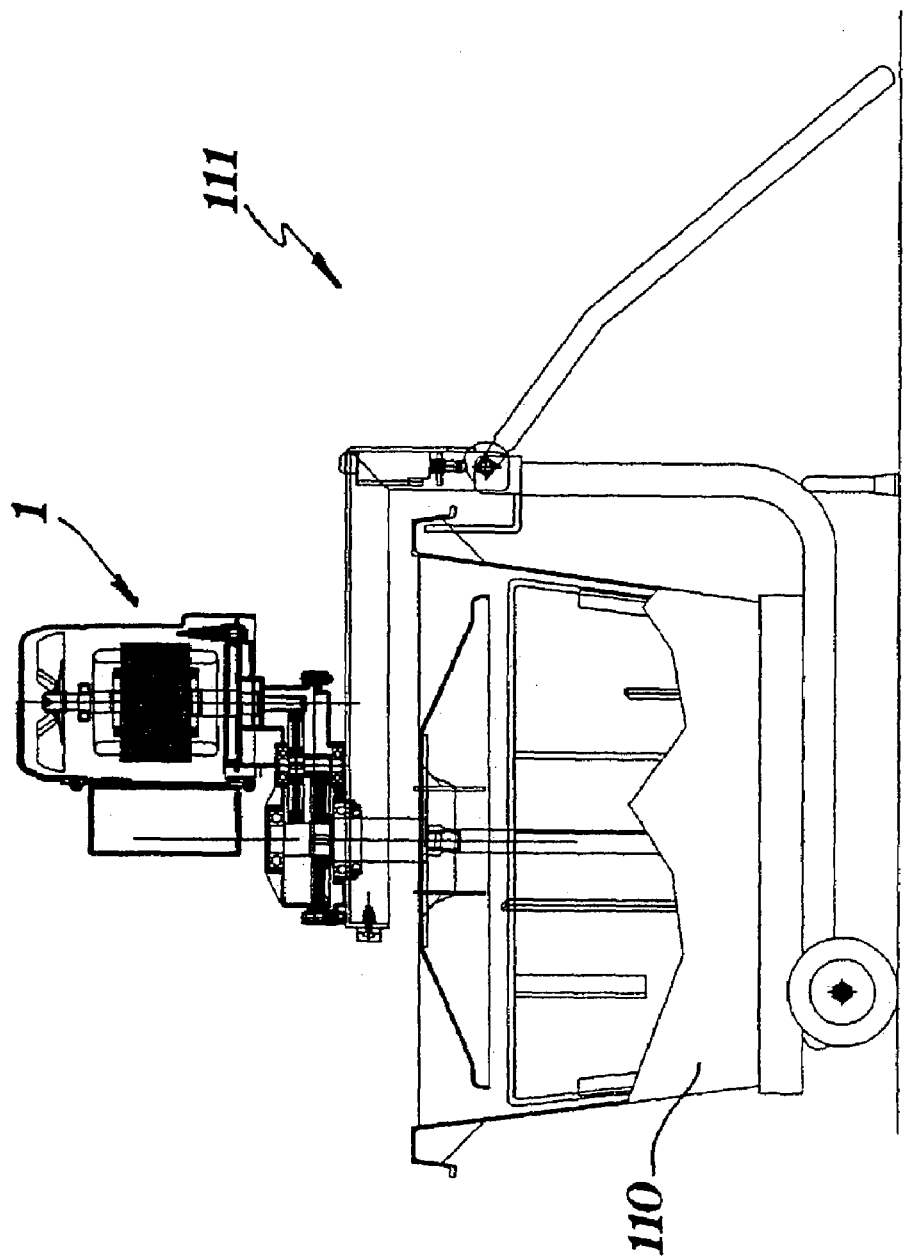
FIG. 5 shows a side view, with parts taken away, of a fourth possible example of application of the motorreducer in question.

Shown in FIGS. 2A–B, 3A–B and 4A–B are respectively, a mixer with rotary support, a drum mixer and a wheelbarrow mixer; in these figures, the building machine is designated with numeral (11) the tank with (10) and the motor-reducer with (1), while the other parts have not been numbered because of known type. In FIG. 5, the motor-reducer (1) is associated with the tank (110) and a stirrer (111). It will be appreciated that further application examples are possible, as those skilled in the art can easily understand.

According to the invention, the body of the electric motor (2) that is, the casing (12) holding the rotor (5), stator (13) and relevant windings, and the electric system's section (14), are housed within a coating shell (15) of insulating material.

The shell (15) comprises a main body having a substantially cylindrical shape, open in correspondence of a base, and an auxiliary body (16), located on top in the example of FIG. 1, able to enclose the group (14) of the electrical system's components (not shown) which are outside the motor (2).

The electrical system (14) can be constructed and mounted separately from the shell (15), and still leaving unaltered the operational capacity of the second electrical protection of the assembly. This solution being not illustrated for the sake of simplicity.

The shell (15) is provided with aeration apertures (18) in correspondence of the region of fan (17) of the electric motor (2) (left side in FIG. 1).

On the opposite side, the shell (15) is closed by a flange (19) which is made of electrically insulating material and interposed between the right-side part of casing (12) and the reducer (3). In particular, the flange (19) is fastened by screw means (20) to the casing (12), and the connection portion (21) of reducer (3) is fastened on the flange (19); the screws (20) are isolated from the casing (12). To ensure the insulation degree around the rotor's shaft, in correspondence of the portion of shaft (22) on which the rotor (5) is fixed, there is provided a bush (23) in insulating material which, therefore, results interposed between the shaft (22) and rotor (5).

In this way, it is possible to fulfill the requirement of dual electrical insulation required for mixers, stirrers and similar building machines.

Figure 6:
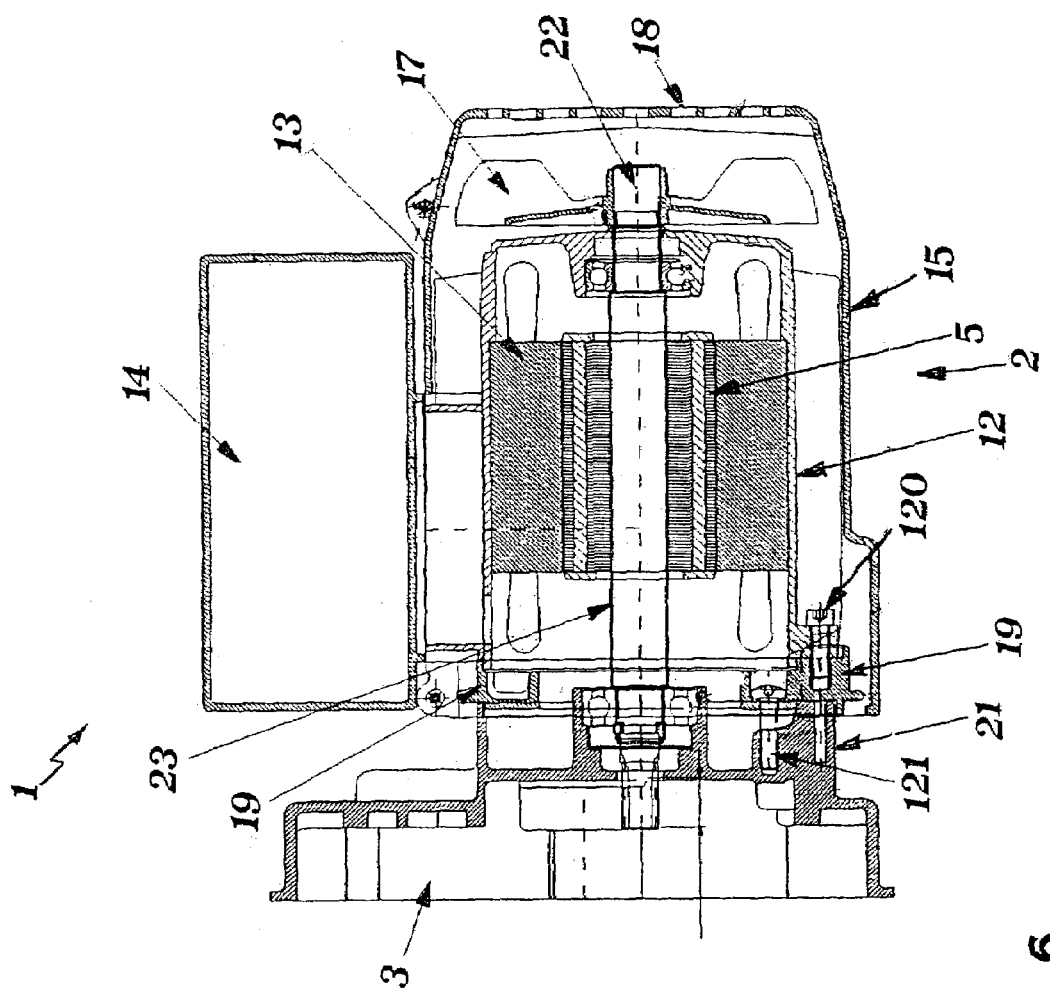
FIG. 6 is a schematic view in longitudinal section of a further possible embodiment of a motor-reducer according to the present invention.

In the illustrated example of FIG. 6, the insulating bush (23) extends almost over the whole length of the shaft (22) of rotor (5).

Moreover, in place of screws (20) which, in the example of FIG. 1, fix the casing (12) to the portion (21) of reducer (3), provision is made for two sets of screws designated, respectively, with (120) and (121). The screws (120) and (121) may be disposed along respective concentric circumferences; in FIG. 6, the representation in longitudinal section allows only one of screws (120) and one of screws (121) to be seen. The screws (120) connect the motor's casing (12) to the flange (19). The screws (121) connect the flange (19) to the reducer (3), in correspondence of said connection portion (21). Practically, in this embodiment, the insulation of the rotor is developed over an extension greater than in the example of FIG. 1 and, besides, the connection between the motor and reducer is made by connecting the flange to the two elements independently, that is, by means of the two separate sets of screws (120) and (121).

While specific embodiments of the invention have been shown and described in detail to illustrate the application of the principles of the invention, it will be understood that the invention may be embodied otherwise without departing from such principles.

The invention claimed is:

1. A mixer/stirrer motor and reducer, for mixer and stirrer building machines, the motor reducer comprising:
   an electric motor with rotor and stator and a motor shaft;
   an electric motor casing with said rotor and stator being disposed therein;
   a reducer with a gear train connected to an output shaft for moving a mixing tank and with a connecting part with a shaft bearing supporting said motor shaft;
   a box-shaped shell made of insulating material having plural sides surrounding said electric motor casing and with an lateral open end;
   a flange made of electrically insulating material interposed between the motor and said connecting part of the reducer and connected to each of said connecting part of said reducer and said electric motor casing providing an insulated connection to electrically insulate said electric motor and electric motor casing from said reducer pear train;
   electrically insulating material means interposed between said gear train and said rotor for electrically isolating said reducer from said motor, wherein said motor shaft is fixed to said rotor, coaxially therewith, said electrically insulating material means comprising a bush made of insulating material fitted on said shaft and interposed between said rotor and said motor shaft; and wherein said bush extends over an entire length of said motor shaft continuously from beyond said shaft bearing supporting said motor shaft at said connecting part to beyond another bearing supporting said motor shaft and to insulate said shaft bearing and said another bearing from said rotor.

2. A mixer/stirrer motor and reducer according to claim 1, wherein said flange is connected to said motor casing by said insulated connection formed by a first set of screws and said flange is connected to a portion of said reducer by a second set of screws.

3. A mixer/stirrer motor and reducer according to claim 2, wherein said output shaft is directly connected with said tank.

4. A mixer/stirrer motor and reducer according to claim 1, further comprising a box shaped body made of insulating material and components of the electrical system, said box shaped body enclosing said group of components at a location outside said motor casing, wherein said shell is joined or is associated with said box-shaped body.

5. A mixer/stirrer motor and reducer according to claim 4, wherein said output shaft is directly connected with said tank.

6. A mixer/stirrer motor and reducer according to claim 1, wherein said output shaft is directly connected with said tank.

7. A mixer/stirrer motor and reducer according to claim 1, wherein said output shaft is directly connected with said tank.

8. A mixer/stirrer motor and reducer according to claim 1, wherein said output shaft is directly connected with said tank.

9. A mixer/stirrer motor and reducer, for mixer and stirrer building machines, the motor reducer comprising:
   an electric motor with rotor and stator and a motor shaft supported by bearings;
   an electric motor casing with said rotor and stator being disposed therein;
   a reducer with a gear train connected to an output shaft for moving a mixing tank;
   a box-shaped shell made of insulating material having plural sides surrounding said electric motor casing and with an lateral open end;
   a flange made of electrically insulating material interposed between the motor and the reducer to electrically isolate said electric motor and electric motor casing from said reducer; and
   electrically insulating material means interposed between said motor shaft and said rotor for electrically isolating said reducer from said motor, said motor shaft being fixed to said rotor, coaxially therewith, said electrically insulating material means comprising a bush made of insulating material fitted on said shaft and interposed between said rotor and said motor shaft, wherein said casing is connected to a bearing supporting said motor shaft and said reducer includes another bearing supporting said motor shaft, and said electrically insulating material means is a bush extending over an entire length of said motor shaft in a region of said rotor and extending from said bearing to said another bearing to insulate said bearing and said another bearing from said rotor.

10. A mixer/stirrer motor and reducer according to claim 9, wherein said flange is connected to each of said reducer and said electric motor casing with an insulated connection comprising a first set of screws connecting said flange and said electric motor casing and a second set of screws connecting said flange to a portion of said reducer.

11. A mixer/stirrer motor and reducer according to claim 9, further comprising a box shaped body made of insulating material and components of the electrical system, said box shaped body enclosing said group of components at a location outside said motor casing, wherein said shell is joined or is associated with said box-shaped body.

12. A mixer/stirrer motor and reducer according to claim 9, wherein said output shaft is directly connected with said tank.

13. A mixer/stirrer, comprising:
a mixing tank;
an electric motor with rotor and stator and a motor shaft supported by bearings;
an electric motor casing with said rotor and stator being disposed therein;
a reducer with a gear train connected to an output shaft, said output shaft being connected to said mixing tank for moving said mixing tank;
a box-shaped shell made of insulating material having plural sides surrounding said electric motor casing and with an lateral open end;
a flange made of electrically insulating material interposed between the motor and the reducer to electrically isolate said electric motor and electric motor casing from said reducer; and
electrically insulating material means interposed between said motor shaft and said rotor for electrically isolating said reducer from said motor said motor shaft being fixed to said rotor, coaxially therewith, said electrically insulating material means comprising a bush made of insulating material fitted on said shaft and interposed between said rotor and said motor shaft, wherein said casing is connected to a bearing supporting said motor shaft and said reducer includes another bearing supporting said motor shaft, and said electrically insulating material means is a bush extending continuously over an entire length of said motor shaft in a region of said rotor from said bearing to said another bearing and continuing beyond said bearing in a direction away from said rotor and continuing beyond said another bearing in a direction away from said rotor to insulate said bearing and said another bearing from said rotor.

14. A mixer/stirrer motor and reducer according to claim 13, wherein said flange is connected to each of said reducer and said electric motor casing with an insulated connection comprising a first set of screws connecting said flange and said electric motor casing and a second set of screws connecting said flange to a portion of said reducer.

15. A mixer/stirrer motor and reducer according to claim 13, further comprising a box shaped body made of insulating material and components of the electrical system, said box shaped body enclosing said group of components at a location outside said motor casing, wherein said shell is joined or is associated with said box-shaped body.

16. A mixer/stirrer motor and reducer according to claim 13, wherein said output shaft is directly connected with said tank.

* * * * *